United States Patent
Tomiki et al.

(10) Patent No.: US 9,490,654 B2
(45) Date of Patent: Nov. 8, 2016

(54) NON-CONTACT CHARGING METHOD

(71) Applicant: SANYO ELECTRIC CO., LTD., Osaka (JP)

(72) Inventors: Masahiro Tomiki, Hyogo (JP); Tatehito Yagi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 211 days.

(21) Appl. No.: 14/364,704

(22) PCT Filed: Nov. 26, 2012

(86) PCT No.: PCT/JP2012/080422
§ 371 (c)(1),
(2) Date: Jun. 12, 2014

(87) PCT Pub. No.: WO2013/108485
PCT Pub. Date: Jul. 25, 2013

(65) Prior Publication Data
US 2015/0002103 A1    Jan. 1, 2015

(30) Foreign Application Priority Data
Jan. 17, 2012   (JP) ................................ 2012-007289

(51) Int. Cl.
*H02J 7/04*   (2006.01)
*H02J 7/16*   (2006.01)
(Continued)

(52) U.S. Cl.
CPC ............... *H02J 7/025* (2013.01); *H02J 7/007* (2013.01); *H02J 7/0052* (2013.01); *H02J 2007/0001* (2013.01); *H02J 2007/0059* (2013.01); *H02J 2007/0096* (2013.01)

(58) Field of Classification Search
USPC .................................................. 320/108, 139
See application file for complete search history.

(56) References Cited

U.S. PATENT DOCUMENTS

| | | | |
|---|---|---|---|
| 8,188,854 B2 * | 5/2012 | Yamashita | H02J 7/025 320/108 |
| 2009/0133942 A1 * | 5/2009 | Iisaka | H02J 7/025 178/43 |
| 2009/0322280 A1 * | 12/2009 | Kamijo | H02J 9/005 320/108 |

(Continued)

FOREIGN PATENT DOCUMENTS

| | | |
|---|---|---|
| EP | 1 022 840 | 7/2000 |
| JP | 2008-017562 | 1/2008 |

(Continued)

*Primary Examiner* — Brian Ngo
(74) *Attorney, Agent, or Firm* — Wenderoth, Lind & Ponack, L.L.P.

(57) ABSTRACT

In a non-contact charging method, a battery-equipped device is set on a charging stand, and a power reception coil of the battery-equipped device is electromagnetically coupled to a power transmission coil of the charging stand, and power is transmitted from the power transmission coil to the power reception coil by an electromagnetic induction action, and a battery of the battery-equipped device is charged by power induced to the power reception coil. Furthermore, in the non-contact charging method, charging current of the battery is detected at the battery-equipped device side, the detected charging current is compared with a current change determination threshold, and it is determined that a foreign object is set on the charging stand when the charging current is less than the current change determination threshold, and it is determined that the foreign object is not set in the charging stand when the charging current is greater than the current change determination threshold.

11 Claims, 4 Drawing Sheets

(51) Int. Cl.
*H02J 7/02* (2016.01)
*H02J 7/00* (2006.01)

(56) References Cited

U.S. PATENT DOCUMENTS

| | | | | |
|---|---|---|---|---|
| 2010/0001845 | A1* | 1/2010 | Yamashita | H02J 7/025 340/10.4 |
| 2010/0013432 | A1* | 1/2010 | Toya | H02J 7/0027 320/108 |
| 2010/0225173 | A1* | 9/2010 | Aoyama | H02M 3/337 307/104 |
| 2011/0285210 | A1 | 11/2011 | Lemmens et al. | |
| 2012/0175967 | A1 | 7/2012 | Dibben et al. | |
| 2012/0313579 | A1* | 12/2012 | Matsumoto | H02J 7/025 320/108 |

FOREIGN PATENT DOCUMENTS

| | | |
|---|---|---|
| JP | 2011-507481 | 3/2011 |
| WO | WO 2009/081115 | 7/2009 |

* cited by examiner

NON-CONTACT CHARGING METHOD

TECHNICAL FIELD

The present invention is related to a non-contact charging method in which a power transmission coil and a power reception coil are closely set so as to electromagnetically coupled, and power is transmitted from the power transmission coil to the power reception coil by an electromagnetic induction action, and a battery is charged by power induced to the power reception coil, especially to the non-contact charging method of determining whether or not a foreign object is set on the charging stand.

BACKGROUND ART

A non-contact charging method of the following is developed (see patent literature 1). In this non-contact charging method, a battery-equipped device equipped with a power reception coil is set on a charging stand equipped with a power transmission coil, and power is transmitted from the power transmission coil to the power reception coil, and an incorporated battery of the battery-equipped device is charged.

In this non-contact charging method, when the battery-equipped device is set on the charging stand such that the power reception coil of the battery-equipped device is electromagnetically coupled to the power transmission coil, and power is transmitted from the power transmission coil to the power reception coil, the battery is charged by power induced to the power reception coil. This charging method does not need to connect the battery-equipped device to a charger through a connector, then by non-contact charging way the incorporated battery is conveniently charged.

In this charging method, when a foreign object of a metal piece of clip or the like is set in a state of charging the battery-equipped device, induced current flowing through the foreign object generates heat of Joule heat as harmful effects. Further power is consumed by induced current flowing through the foreign object, so the battery is not efficiently charged as a demerit. In order to solve such a demerit, in the charging stand of patent literature 1, plural temperature sensors are disposed longitudinally and laterally in the upper surface. The temperature sensors detect generating heat of the foreign object set on the charging stand. In this charging stand in a state of the metal foreign object being set on it, when alternating current power is supplied to the power transmission coil, as induced current flowing through the foreign object generates heat, this charging stand detects this heat generation of the foreign object by the adjacent temperature sensor.

CITATION LIST

Patent Literature

Patent Literature 1:
Japanese Laid-Open Patent Publication No. 2008-17562

SUMMARY OF THE INVENTION

As the above charging stand cannot specify where the foreign object is located on it, a lot of temperature sensors need to be disposed in the upper surface of it. Therefore the number of the temperature sensors is increased, so part cost is increased. In addition, the charging stand does not specify which temperature sensor detects heat generation by a location of the foreign object. As it is necessary to determine as to whether or not the foreign object is set from all of the plural temperature sensors, a detecting circuit which detects the foreign object setting by the detected temperature of the temperature sensors becomes complicated. It is a demerit that the above charging stand cannot detect the foreign object by a simple circuit.

In addition, as the above charging stand detects the foreign object setting based on detected temperature of the temperature sensor, there is a delay time in detecting of the foreign object. It is a demerit that the above charging stand cannot quickly detect.

Furthermore in this charging stand the plural temperature sensors are disposed in the upper surface, so the temperature sensors or fixing parts thereof are disposed between the power transmission coil and the power reception coil. Therefore a distance between the power transmission coil and the power reception coil becomes bigger, and it is a demerit that a power transmittance efficiency is decreased. As the power transmission coil and the power reception coil are electromagnetically coupled and power is transmitted, in order to efficiently transmit power, it is important that they are closely disposed and a distance therebetween is narrowed. However in the structure in which the temperature sensors are disposed between the power transmission coil and the power reception coil, it is impossible to closely dispose the power transmission coil and the power reception coil, therefore it is a demerit that the power transmittance efficiency is decreased.

The present disclosure is developed for the purpose of solving such drawbacks. One non-limiting and explanatory embodiment provides a non-contact charging method which quickly and reliably detects that a foreign object is set on a charging stand, by a simple circuit configuration, and carries out charging while power is efficiently transmitted from a power transmission coil to a power reception coil.

In a non-contact charging method of the present disclosure, a battery-equipped device is set in a charging stand, and a power reception coil of the battery-equipped device is electromagnetically coupled to a power transmission coil of the charging stand, and power is transmitted from the power transmission coil to the power reception coil by an electromagnetic induction action, and a battery of the battery-equipped device is charged by the power induced to the power reception coil. Further the non-contact charging method comprises supplying a plurality of pulse powers having different powers to the power transmission coil by the charging stand at a predetermined time interval, detecting currents of the power transmission coil in states of supplying the plurality of pulse powers having different powers by the charging stand, and determining whether or not a foreign object is set on the charging stand based on differences of the detected current values corresponding to the plurality of pulse powers having different powers by the charging stand.

The above non-contact charging method quickly and reliably detects that the foreign object is set on the charging stand by a simple circuit configuration. That's the reason why the method comprises supplying the plurality of pulse powers having different powers to the transmission coil, detecting currents of the power transmission coil, and determining setting of the foreign object based on differences of the detected current values corresponding to the plurality of pulse powers having different powers. The non-contact charging method of the present disclosure does not detect the foreign object only by the current magnitude of the power transmission coil. By detecting currents of the power transmission coil in the states of supplying the plurality of pulse powers having different powers, the non-contact charging method of the present disclosure detects setting of the foreign object based on differences of the detected current values.

When the battery-equipped device is normally set on the charging stand, or the foreign object made of metal is set on the charging stand, load of the power transmission coil changes. At the time of the battery-equipped device being set, the power reception coil is electromagnetically coupled to the power transmission coil, and the power reception coil becomes load. The power reception coil is connected to a rectifying circuit, and the rectifying circuit is connected to the battery. Those load connected to the power reception coil changes impedance by voltage induced in the power transmission coil. For example, as shown in FIG. 1, the rectifying circuit is connected to a Zener diode 57 in order to stabilize output voltage. The Zener diode 57, as shown in voltage-current characteristics of FIG. 2, increases current, being turned to a conductive state when the reverse voltage inputted at both ends exceeds the Zener voltage. In the rectifying circuit 56 connected to the Zener diode 57 at output side, the voltage induced in the power reception coil 51 is low, and output voltage of the rectifying circuit 56 becomes low. Then voltage supplied to the Zener diode 57 becomes low, so current does not flow through the Zener diode 57, and it makes load impedance high. However the voltage induced in the power reception coil 51 is high, and output voltage of the rectifying circuit 56 becomes high. Then current which flows through the Zener diode 57 becomes large, and it makes load impedance low.

In addition at the time of detecting the foreign object, in the battery-equipped device in which the battery is connected to the rectifying circuit, the load impedance is large at a small charging current of the battery when the voltage induced in the power reception coil is low. The load impedance is low at a large charging current of the battery when the voltage induced in the power reception coil is high.

As mentioned above, in the battery-equipped device, the load impedance changes corresponding the voltage induced in in the power reception coil. Therefore in a state of the power reception coil electromagnetically coupled to the power transmission coil, when supplying power of the power transmission coil changes, the current of the power transmission coil changes widely. When supplying power of the power transmission coil is made large, the voltage induced in the power reception coil is made high, then the load impedance becomes small. And when the load impedance of the power reception coil becomes small, the load impedance of the power transmission coil electromagnetically coupled to this becomes small. And large current flows through the power transmission coil of the low load impedance. When supplying power of the power transmission coil is made large, as the load impedance of the power transmission coil becomes small, current of the power transmission coil is not in proportion to the supplying power, so the current becomes bigger than the supplying power becomes. When supplying power of the power transmission coil is made small, the current becomes smaller than the supplying power becomes. Therefore in the state of the power reception coil electromagnetically coupled to the power transmission coil, namely the state of the battery-equipped device being set on the charging stand, the current of the power transmission coil does not become large in proportion to the supplying power.

In the contrast to this, when the foreign object made of metal is set on the charging stand, load impedance of the foreign object does not change to the supplying power, and current of the power transmission coil is in proportion to supplying power of the power transmission coil. FIG. 3 and FIG. 4 show a state of the foreign object made of metal being set, and a state of the battery-equipped device being set. FIG. 3 shows the state of the foreign object made of metal being set, and FIG. 4 shows the state of the battery-equipped device being set. In the detection of FIG. 3 and FIG. 4, the charging stand supplies the same pulse powers. When the foreign object is set on the charging stand, as shown in FIG. 3, it is detected that the currents of the power transmission coil corresponding to the pulse powers are approximately in proportion to the supplying powers. However when the battery-equipped device is set on the charging stand, as shown in FIG. 4, detected currents become very small in a state of small pulse powers. In the battery-equipped device, as the detected currents are changed very widely, a state in which the detected currents are largely changed is determined as the battery-equipped device being set, and a state in which the detected currents are small changed is determined as the foreign object being set.

As shown in FIG. 3 and FIG. 4, the changes of the detected currents are determined by setting the threshold, and by comparing the detected currents with the threshold. Namely as shown in figures, in the method of detecting the detected currents to the two of the pulse powers, when both detected currents exceed the threshold, a determination is made as the foreign object being object being set as shown in FIG. 3, and when large detected currents exceed the threshold and small detected currents do not exceed the threshold, a determination is made as the battery-equipped device being set as shown in FIG. 4. In addition, in neither the battery-equipped device nor the foreign object being set, as shown in FIG. 5, the currents of the power transmission coil to the pulse powers are very small. That is the reason why the power transmission coil becomes a state of no load. Therefore when neither of two detected currents exceeds the threshold, a determination is made as neither the battery-equipped battery being set nor the foreign object being set.

The above method determines the battery-equipped device or the foreign object by comparing the detected current with the threshold. However one method can determine the battery-equipped device or the foreign object from differences between the small detected currents and the large detected currents corresponding to the pulse powers. That is the reason why the state of the battery-equipped device being set has larger difference between the small detected currents and the large detected currents than the state of the foreign object being set.

In the non-contact charging method of the present disclosure, the detected current values are compared with a predetermined threshold, and it is determined that neither the foreign object nor the battery-equipped device is set on the charging stand when all the detected current values are less than the predetermined threshold, and it is determined that the foreign object is not set on the charging stand when any one of the detected current values is less than the predetermined threshold and any other one of the detected current values is more than the predetermined threshold, and it is determined that the foreign object is set on the charging stand when all the detected current values are more than the predetermined threshold.

In the non-contact charging method of the present disclosure, pulse duration in supplying the pulse power to the power transmission coil from the charging stand is 1 millisecond-50 millisecond.

In the non-contact charging method of the present disclosure, the two of pulse powers having different powers are supplied at the predetermined time interval from the charging stand.

In the non-contact charging method of the present disclosure, currents which flow through the power transmission coil are rectified, and are detected by the charging stand.

DESCRIPTION OF EMBODIMENTS

Embodiments of the present invention will be described below based on the drawings. Note, however, that the embodiments shown below exemplify a non-contact charging method for embodying the technical idea of the present invention, and the present invention does not specify the non-contact charging method to method or circuit configuration shown below. It does not mean that the members shown in the claims are specified to the members in the embodiments.

Figure 1:
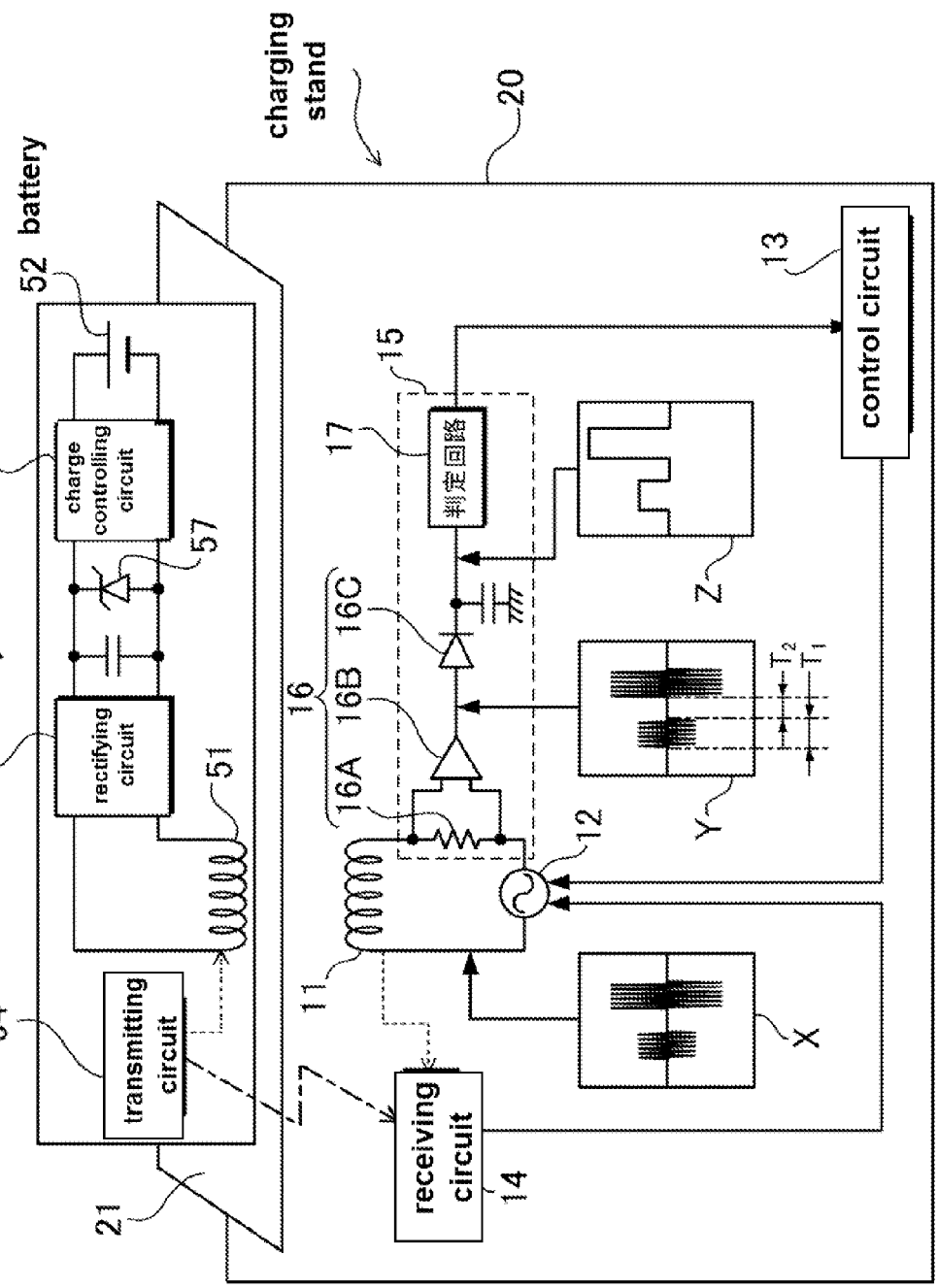
FIG. 1 is a block diagram showing a charging stand and a battery-equipped device used in a non-contact charging method according to an embodiment of the present disclosure.
Figure 2:
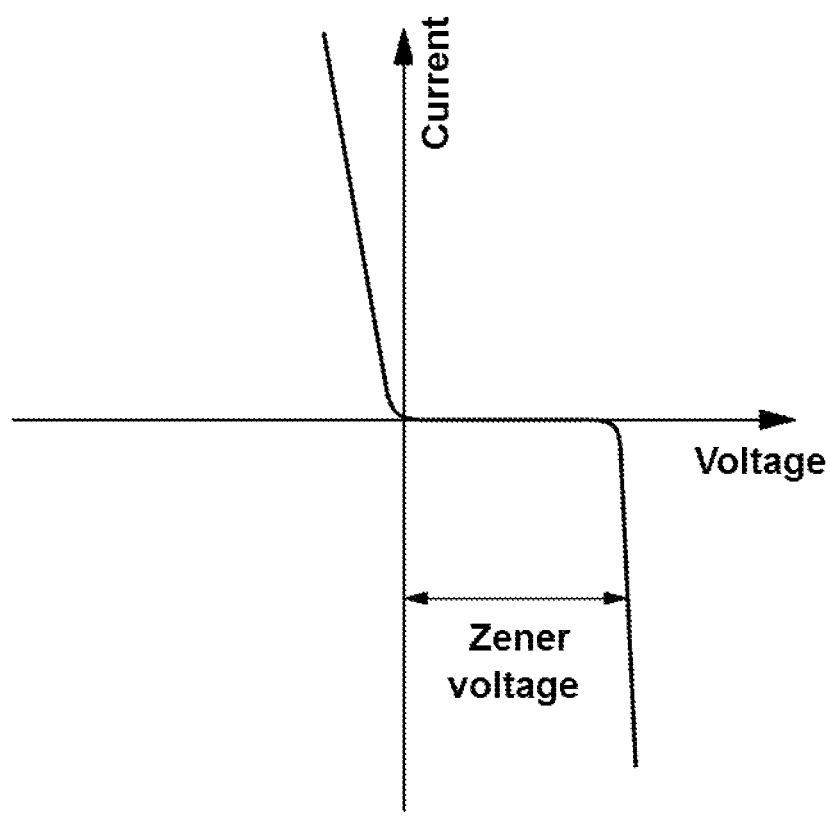
FIG. 2 is a graph representing voltage-current characteristics of Zener diode.

FIG. 1 shows a state in which a battery 52 of a battery-equipped device is charged while the battery-equipped device is set on a charging stand in an embodiment of the present disclosure in the invention.

As shown in a block diagram of FIG. 1, in the charging stand 10, an upper plate 21 on which the battery-equipped device 50 is set is provided in the upper surface of a case 20, and a power transmission coil 11 is disposed inside the upper plate 21. The power transmission coil 11 is connected to an alternating current power source 12, and the alternating current power source 12 is controlled by a control circuit 13. The control circuit 13 controls supplying a plurality of pulse powers having different powers to the transmission coil 11 at the timing of detecting a foreign object. In addition the charging stand 10 has a foreign object detecting circuit 15 to determine whether or not the foreign object is set by detecting a current of the power transmission coil 11.

The charging stand 10 electromagnetically couples the power transmission coil 11 to the power reception coil 51, and power is transmitted from the power transmission coil 11 to the power reception coil 51. The battery-equipped device 50 is set on the upper plate 21 in free position, and the charging stand 20 charging the battery 52 incorporates the structure (not shown in figures) in which the power transmission coil 11 is moved along the upper plate 21 so as to approach the power reception coil 51. In this charging stand 10 the power transmission coil 11 is provided under the upper plate 21, and is moved along the upper plate 21, approaches the power reception coil 51. However the charging stand 10 does not necessarily need to incorporate the structure in which the power transmission coil 11 approaches the power reception coil 51, then the other structure in which the battery-equipped device is set at a fixed position of the charging stand is also available.

The power transmission coil 11 is a planar coil wound in a spiral shape in parallel to the upper plate 21, and emits an AC magnetic flux above the upper plate 21. The power transmission coil 11 emits the AC magnetic flux in the direction transverse to the upper plate 21. Alternating current power is supplied to the power transmission coil 11 from the alternating current power source 12, and the power transmission coil 11 emits the AC magnetic flux above the upper plate 21. The power transmission coil 11 can make its inductance bigger by a core (not shown in figures) made of magnetic material around which electric wire is wound. The power transmission coil having the core can concentrate the flux into a specific portion, and power is efficiently transmitted to the power reception coil. Here the power transmission coil does not necessarily have the core, can be an air-core coil. As the air-core coil is light, in the structure in which the power transmission coil 11 is moved inside the upper plate, a moving structure can be simple. The power transmission coil 11 is approximately the same external diameter as the power reception coil 51, power is efficiently transmitted to the power reception coil 51.

The alternating current power source 12 supplies, for example, high frequency power of 20 kHz to 1 MHz to the power transmission coil 11. The alternating current power source 12 oscillates alternating current signal by oscillating circuit, and amplifies power of the oscillated alternating current signal by a power amplifier, then supplies alternating current power to the power transmission coil.

In a state of electromagnetically coupling, the charging stand 10 supplies alternating current power to the power transmission coil 11 by the alternating current power source 12, and transmits power to the power reception coil 51 of the battery-equipped device 50. The battery-equipped device 50 charges the battery 52 by power transmitted to the power reception coil 51. When the battery 52 is fully charged, the charging stand 10 detects a full charge signal transmitted from the battery-equipped device 50, and stops power supply to the power transmission coil 11, then stops charging the battery 52.

The foreign object detecting circuit 15 controls the control circuit 13, and supplying powers of the plurality of pulses to the power transmission coil 11, and determines whether or not the foreign object is set by detecting the current of the power transmission coil 11. The foreign object detecting circuit 15 controls the control circuit 13, and supplies pulse powers to the power transmission coil 11 in a predetermined sampling period (=a predetermined time interval), then determines whether or not the battery-equipped device 50 or the foreign object is set on the charging stand 10, further determines that neither the battery-equipped device 50 nor the foreign object is set. When the foreign object detecting circuit 15 detects setting of the battery-equipped device 50, the foreign object detecting circuit 15 outputs a detecting signal to the control circuit 13. When the detecting signal detecting setting of the battery-equipped device 50 is inputted into the control circuit 13, the control circuit 13 supplies alternating current power to the power transmission coil 11 to charge the incorporated battery 52 of the battery-equipped device 50, and charges the incorporated battery 52 by power transmission from the power transmission coil 11 to the power reception coil 51. When the foreign object detecting circuit 15 detects setting of the foreign object, the foreign object detecting circuit 15 outputs a foreign object detecting signal to the control circuit 13. When the foreign object detecting signal detecting setting of the foreign object is inputted into the control circuit 13, the control circuit 13 controls the alternating current power source 12, and stops supplying alternating current power to the power transmission coil 11. Namely the charging stand 10 does not start power transmission.

Furthermore, the foreign object detecting circuit 15 can detects setting of the foreign object also in a state of charging the incorporated battery 52 of the battery-equipped device 50 which is set on the charging stand 10. In the state of charging the incorporated battery 52 of the battery-equipped device 50, when the foreign object detecting circuit 15 detects setting of the foreign object, the foreign object detecting circuit 15 outputs the foreign object detecting signal to the control circuit 13, and cuts off power transmission, then interrupts charging the incorporated battery 52.

The foreign object detecting circuit 15 of the charging stand 10 controls the control circuit 13, and supplies the plurality of pulse powers having different powers (see waveform X in FIG. 1) to the power transmission coil 11 in the predetermined sampling period, then determines whether or not the battery-equipped device 50 or the foreign object is set. The foreign object detecting circuit 15 of FIG. 1 comprises a current detecting circuit 16 which detects current of the power transmission coil 11, and a determining circuit 17 which determines whether or not the battery-equipped device 50 or the foreign object is set based on current values detected in the current detecting circuit 16.

The current detecting circuit 16 comprises a current detecting resistance 16A which is connected in series to the power transmission coil 11, a differential amplifier 16B which amplifies a voltage between both ends of the current detecting resistance 16A, and a rectifying circuit 16C which converts to a direct current by rectifying output of the differential amplifier 16B. The current detecting circuit 16 amplifies the alternating current voltage generated in the current detecting resistance 16A by the differential amplifier 16B, and rectifies by the rectifying circuit 16C. However the current detecting circuit 16 can also rectify the alternating current voltage generated in the current detecting circuit by the rectifying circuit, and amplifies a rectified direct current voltage by the amplifier.

At both ends of the current detecting resistance 16A, pulse signals including alternating current signals are induced in synchronization with a timing of inputting the pulse powers to the power transmission coil 11, as shown by a waveform Y in FIG. 1. Time width (T1) of the pulse signal, namely pulse duration (T1) in inputting the pulse power to the transmission coil 11 is approximately 10 millisecond-50 millisecond. Here the pulse duration in inputting the pulse power to the power transmission coil 11 can be, for example, 1 millisecond-50 millisecond. By the pulse duration (T1) in inputting the pulse power to the power transmission coil 11, the battery-equipped device 50 or the foreign object can be shortly, quickly detected. However by too short pulse duration, it is difficult to precisely detect the battery-equipped device 50 or the foreign object. Therefore the pulse duration (T1) in inputting the pulse power is set at the optimum value in the above range considering detecting precision and detecting time.

In addition in a state of inputting the plurality of pulse powers, rest time (T2) from stopping inputting of the previous pulse power to inputting of the next pulse power is approximately 1 millisecond-5 millisecond. However the rest time (T2) is also set as 0 millisecond-10 millisecond. By shortening the rest time, a determination of the battery-equipped device or the foreign object is quickly carried out. In the contrast, by making the rest time longer, the pulse power is certainly distinguished, and the battery-equipped device or the foreign object is more precisely detected.

The charging stand 10 of FIG. 1 inputs the two of pulse powers having different powers to the power transmission coil 11, and detects the battery-equipped device or the foreign object. The charging stand 10 can also input equal to or more than three of pulse powers having different powers to the power transmission coil 11, and more precisely detect the battery-equipped device or the foreign object.

The differential amplifier 16B amplifies the pulse signals including alternating current signals generated in the current detecting resistance 16A, and outputs to the rectifying circuit 16C. The rectifying circuit 16C rectifies pulse signals including alternating current signals outputted from the differential amplifier 16B, and converts to pulse signals which do not include alternating current signals. Amplitudes of the pulse signals outputted from the rectifying circuit 16C are current values which flow through the power transmission coil 11.

The determining circuit 17 detects the battery-equipped device 50 or the foreign object from the amplitudes of the pulse signals outputted from the rectifying circuit 16C. As the amplitudes of the pulse signals outputted from the rectifying circuit 16C show current values of the power transmission coil 11, the battery-equipped device 50 or the foreign object is determined from the amplitudes of the pulse signals, namely currents of the power transmission coil 11. In order to detect the battery-equipped device 50 or the foreign object from the current values of the power transmission coil 11 detected as the amplitudes of the pulse signals, the determining circuit 17 comprises an A/D converter (not shown in figures) which converts the inputted pulse signals to the digital signals, and a computing circuit (not shown in figures) which detects the battery-equipped device 50 or the foreign object by computing the digital signals outputted from the A/D converter. The computing circuit stores a predetermined threshold in a memory (not shown in figures) to compare the detected amplitudes of the pulse signals, namely the currents of the power transmission coil 11. The threshold stored in the memory is set as the following values. The pulse signal of small amplitude is less than the threshold, and the pulse signal of large amplitude is more than the threshold in the state of the battery-equipped device 50 being set. This threshold which is detected in advance is stored in the memory.

In addition the determining circuit 17 comprises a controlling circuit (not shown in figures) which outputs control signal to the control circuit 13 when the determining circuit 17 detects the battery-equipped device 50 or the foreign object. The control circuit 13 controls the alternating current power source 12, and supplies pulse power having different supplying powers to the power transmission coil 11. Each time of the control signal being inputted, the control circuit 13 supplies the pulse power having different supplying powers to the power transmission coil 11.

The foreign object detecting circuit 15 detects the battery-equipped device 50 or the foreign object being set on the charging stand in the following way.

(1) The controlling circuit of the determining circuit 17 outputs the control signal to the control circuit 13, and the control circuit 13 detects this control signal. Then as shown as waveform X in FIG. 1, the control circuit 13 supplies two of pulse powers having different supplying powers by shifting time to the power transmission coil 11.

(2) When the two of pulse powers having different supplying powers are supplied to the power transmission coil 11, currents flows through the power transmission coil 11, and alternating current signals at both ends of in the current detecting resistance 16A are generated. The alternating current signals are amplified by the differential amplifier 16B (waveform Y in FIG. 1), and direct current signals rectified by the rectifying circuit 16C (waveform Z in FIG. 1) are inputted to the determining circuit 17.

Figure 3:
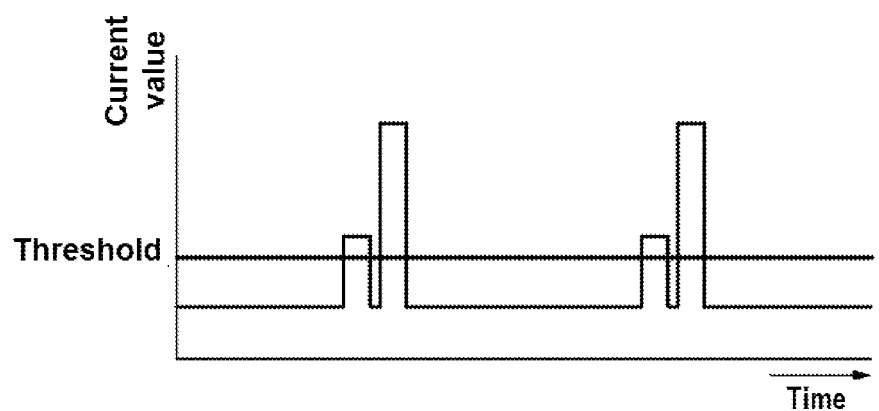
FIG. 3 is a graph representing a current variation of a power transmission coil corresponding to pulse powers in a state of a foreign object being set on the charging stand.
Figure 4:
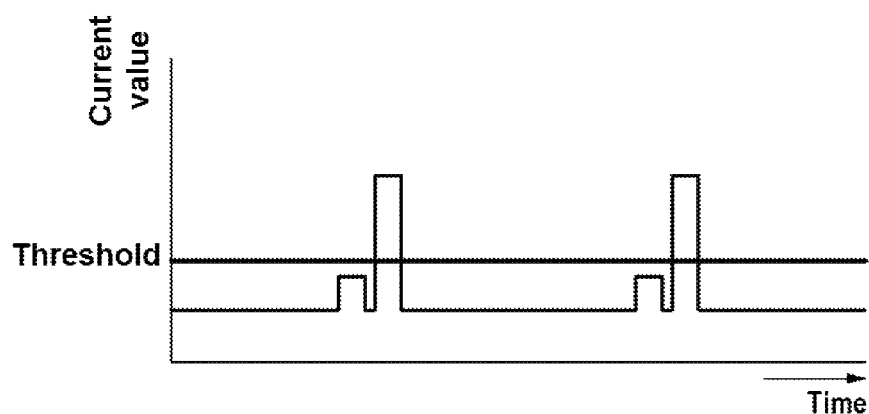
FIG. 4 is a graph representing a current variation of the power transmission coil corresponding to pulse powers in a state of the battery-equipped device being set on the charging stand.
Figure 5:
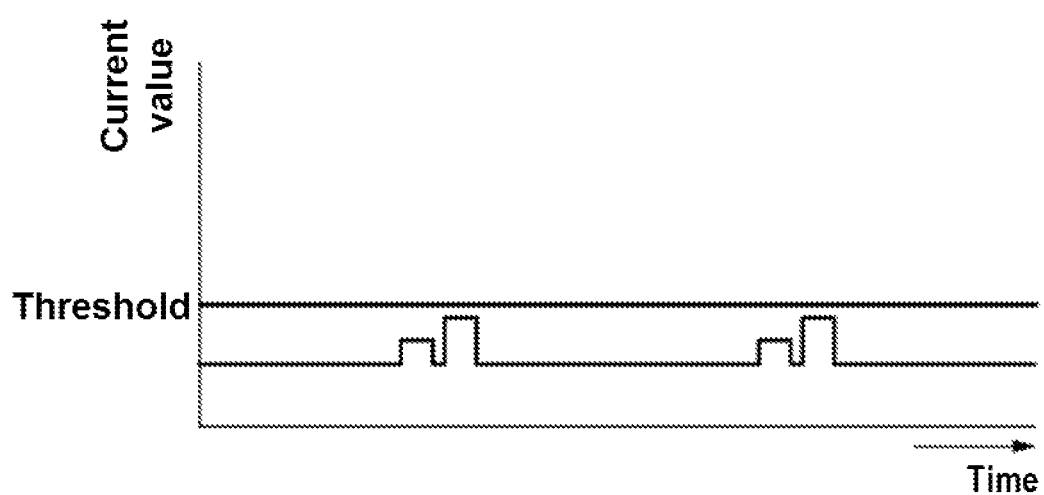
FIG. 5 is a graph representing a current variation of the power transmission coil corresponding to pulse powers in a state of neither the battery-equipped device being set nor the foreign object being set on the charging stand.

(3) The determining circuit 17 converts the inputted direct current signals to the digital signals by A/D converter, and compares the amplitudes of the two pulse signals, namely the two current values with the threshold stored in the memory. As shown in FIG. 3, when all the amplitudes of the two pulse signals, namely all the two current values of the power transmission coil 11 are more than the threshold, the determining circuit 17 determines the foreign object being set. Further as shown in FIG. 4, when the small amplitude among the two pulse signals, namely the small current value is less than the threshold and the large current value detected as the large amplitude is more than the threshold, the determining circuit 17 determines the battery-equipped device 50 being set. Furthermore as shown in FIG. 5, when all the amplitudes of the two pulse signals, namely all the two current values are less than the threshold, the determining circuit 17 determines neither the battery-equipped device 50 nor the foreign object being set.

(4) When the determining circuit 17 determines setting of the battery-equipped device 50, the determining circuit 17 outputs a signal indicating setting of the battery-equipped device 50 to the control circuit 13. The control circuit 13 detects this signal, and supplies power from the alternating current power source 12 to the power transmission coil 11 to charge the incorporated battery 52 of the battery-equipped device 50. When the determining circuit 17 determines setting of the foreign object, or of neither the battery-equipped device 50 nor the foreign object, the determining circuit 17 controls not to supply power from the alternating current power source 12 to the power transmission coil 11.

The foreign object detecting circuit 15 compares the current values of the power transmission coil 11 corresponding to the pulse powers having different supplying powers with the threshold, then detects the battery-equipped device 50 or the foreign object. Furthermore one embodiment of the present invention can detect the battery-equipped device 50 or the foreign object from differences between the current values of the power transmission coil 11 corresponding to the pulse powers having different supplying powers. The state of the battery-equipped device 50 being set has larger difference between the current values corresponding to the pulse powers having different supplying powers than that of the state of the foreign object being set.

Further the above method detects the battery-equipped device 50 or the foreign object by supplying the two of pulse powers having different supplying powers to the power transmission coil 11. Moreover one method can detect the battery-equipped device 50 or the foreign object by supplying equal to or more than three of pulse powers having different supplying powers to the power transmission coil 11.

As shown in FIG. 1, the battery-equipped device in which the incorporated battery is charged by the above method comprises the battery 52, the power reception coil 51, a rectifying circuit 56 which converts alternating current induced in the power reception coil 51 to direct current, a charge controlling circuit 53 which charges the battery 52 by direct current outputted from the rectifying circuit 56, and a transmitting circuit 54 which transmits a state of the incorporated battery 52 to the charging stand 10.

The battery 52 is a lithium ion secondary battery or a lithium polymer battery. Moreover, the battery can be every rechargeable battery of a nickel-hydrogen battery, a nickel-cadmium battery, or the like. The battery-equipped device 50 incorporates one or plural of the battery 52. The plural batteries are connected in series or in parallel, or in series and parallel.

As it is not shown in figures, the rectifying circuit 56 full-wave-rectifies alternating current induced in the power reception coil 51 by a diode bridge, and smooths pulsating current by a smoothing capacitor. The rectifying circuit 56 rectifies alternating current by the diode bridge. In addition The rectifying circuit can also be used as the following synchronous rectifying circuit. FETs are connected in a bridge configuration, and the FETs are switched ON and OFF synchronous with alternating current, then rectifies. The synchronous rectifying circuit of FET has low ON-resistance, so heat generation of the rectifying circuit is decreased, then temperature rising inside the case of the battery-equipped device 50 can be decreased. In addition it does not necessarily need the smoothing capacitor, the battery can also be charged by output of the diode bridge or the synchronous rectifying circuit.

The charge controlling circuit 53 charges the lithium ion secondary battery, the lithium polymer battery, or the like by constant current—constant voltage charging, and charges the nickel-hydrogen battery and the nickel-cadmium battery by constant current charging. In addition the charge controlling circuit 53 detects a full charge of the battery 52, and transmits the full charge signal via a transmitting circuit 54 to the charging stand 10. The charging stand 10 detects at a receiving circuit 14 the full charge signal transmitted from the transmitting circuit 54. By detecting the full charge signal, the control circuit 13 controls the alternating current power source 12, and stops power supply to the power transmission coil 11.

The transmitting circuit 54 transmits various transmitting signals of the full charge signal, an ID signal, or the like from the battery-equipped device 50 to the charging stand 10. The transmitting circuit 54 which transmits the ID signal to the charging stand 10 when setting of the battery-equipped device 50 is confirmed. This transmitting circuit 54 transmits the various transmitting signals to the power transmission coil 11 by changing load impedance of the power reception coil 51. As it is not shown in figures, this transmitting circuit 54 has a modulator circuit which is connected to the power reception coil 51. In the modulator circuit, loads of capacitors or resistances or the like, and a switching element are connected in series, then by carry out ON and OFF control of the switching element, the modulator circuit transmits the various transmitting signals to the charging stand 10.

The receiving circuit 14 of the charging stand 10 detects impedance changes, voltage changes, current changes, or the like of the power transmission coil 11, then detects the transmitting signals from the transmitting circuit 54. When load impedance is changed, impedance, voltage, or current of the power transmission coil 11 electromagnetically coupled to this is changed. Therefore the receiving circuit 14 detects changes of those or the like, and can detect the transmitting signals of the battery-equipped device 50.

The transmitting circuit can also be a circuit which modulates the carrier waves of the radio waves, namely a radio transmitter. The receiving circuit of the transmitting signals transmitted from this transmitting is a radio receiver which receives the carrier waves, and detect the transmitting signals. The transmitting circuit and the receiving circuit can be all the electric circuit structures which can transmit the transmitting signals from the battery-equipped device to the charging stand.

The invention claimed is:

1. A non-contact charging method in which a battery-equipped device is set in a charging stand, and a power reception coil of the battery-equipped device is electromagnetically coupled to a power transmission coil of the charging stand and power is transmitted from the power transmission coil to the power reception coil by an electromagnetic induction action, and a battery of the battery-equipped device is charged by the power induced to the power reception coil, the method comprising:
   supplying a plurality of pulse powers having different powers to the power transmission coil by the charging stand at a predetermined time interval;
   detecting currents of the power transmission coil in states of supplying the plurality of pulse powers having different powers by the charging stand; and
   determining whether or not a foreign object is set on the charging stand based on differences of the detected current values corresponding to the plurality of pulse powers having different powers by the charging stand.

2. The non-contact charging method according to claim 1, wherein the detected current values are compared with a predetermined threshold,
   and it is determined that neither the foreign object nor the battery-equipped device is set on the charging stand when all the detected current values are less than the predetermined threshold,
   and it is determined that the foreign object is not set on the charging stand when any one of the detected current values is less than the predetermined threshold and any other one of the detected current values is more than the predetermined threshold,
   and it is determined that the foreign object is set on the charging stand when all the detected current values are more than the predetermined threshold.

3. The non-contact charging method according to claim 1, wherein pulse duration in supplying the pulse power to the power transmission coil from the charging stand is 1 millisecond-50 millisecond.

4. The non-contact charging method according to claim 1, wherein the two of pulse powers having different powers are supplied at the predetermined time interval from the charging stand.

5. The non-contact charging method according to claim 1, wherein currents which flow through the power transmission coil are rectified, and are detected by the charging stand.

6. The non-contact charging method according to claim 2, wherein pulse duration in supplying the pulse power to the power transmission coil from the charging stand is 1 millisecond-50 millisecond.

7. The non-contact charging method according to claim 2, wherein the two of pulses having different powers are supplied at the predetermined time interval from the charging stand.

8. The non-contact charging method according to claim 3, wherein the two of pulses having different powers are supplied at the predetermined time interval from the charging stand.

9. The non-contact charging method according to claim 2, wherein currents which flow through the power transmission coil are rectified, and the rectified currents are detected by the charging stand.

10. The non-contact charging method according to claim 3, wherein currents which flow through the power transmission coil are rectified, and the rectified currents are detected by the charging stand.

11. The non-contact charging method according to claim 4, wherein currents which flow through the power transmission coil are rectified, and the rectified currents are detected by the charging stand.

* * * * *